USOO5871783A

United States Patent [19]
Capodieci

[11] Patent Number: 5,871,783
[45] Date of Patent: Feb. 16, 1999

[54] APPARATUS FOR ULTRASONICALLY FORMING CONFECTIONERY PRODUCTS

[75] Inventor: Roberto A. Capodieci, Glen Ellyn, Ill.

[73] Assignee: Mars, Incorporated, McLean, Va.

[21] Appl. No.: 701,394

[22] Filed: Aug. 22, 1996

[51] Int. Cl.[6] .................................. A23G 7/00; A23P 1/00
[52] U.S. Cl. ..................... 425/174.2; 99/451; 425/296; 425/298; 425/364 R; 426/238
[58] Field of Search .................. 425/174.2, 296, 425/298, 364 R; 99/451; 426/238

[56] References Cited

U.S. PATENT DOCUMENTS

| | | | |
|---|---|---|---|
| Re. 26,543 | 3/1969 | Beeson, Jr. et al. ..................... | 426/238 |
| 3,961,089 | 6/1976 | Dogliotti .................................. | 426/274 |
| 3,971,838 | 7/1976 | Yazawa ..................................... | 264/51 |
| 4,017,237 | 4/1977 | Webster ................................ | 425/174.2 |
| 4,115,489 | 9/1978 | Macfee ..................................... | 264/23 |
| 4,163,768 | 8/1979 | Stephens .................................... | 264/23 |
| 4,421,773 | 12/1983 | Akutagawa .............................. | 426/660 |
| 4,500,280 | 2/1985 | Astier et al. .......................... | 425/174.2 |
| 4,735,753 | 4/1988 | Ackermann ............................... | 264/23 |
| 4,784,591 | 11/1988 | Ackermann .......................... | 425/174.2 |
| 5,061,331 | 10/1991 | Gute ..................................... | 425/174.2 |
| 5,202,064 | 4/1993 | Furusawa et al. ................... | 425/174.2 |
| 5,230,761 | 7/1993 | Crawford .................................. | 264/23 |

*Primary Examiner*—George Yeung
*Attorney, Agent, or Firm*—Lockwood, Alex, Fitzgibbon & Cummings

[57] ABSTRACT

The invention provides for the manufacture of food products. In one preferred form, methods and apparatus are provided for cutting individual confectionery products from a slab or strip of product material into a product with a particular silhouette. In another form, the invention provides methods and apparatus for both cutting and forming individual confectionery products from strips or ropes. The process can be used for simply forming products from pre-cut segments or other blanks of confectionery material, including imparting a relatively precise texture, finish or detail to such products. The products may, but need not, be subsequently enrobed in chocolate or another coating. The confectionery material may also include candied fruit bits, dry fruits, nuts, or the like.

3 Claims, 10 Drawing Sheets

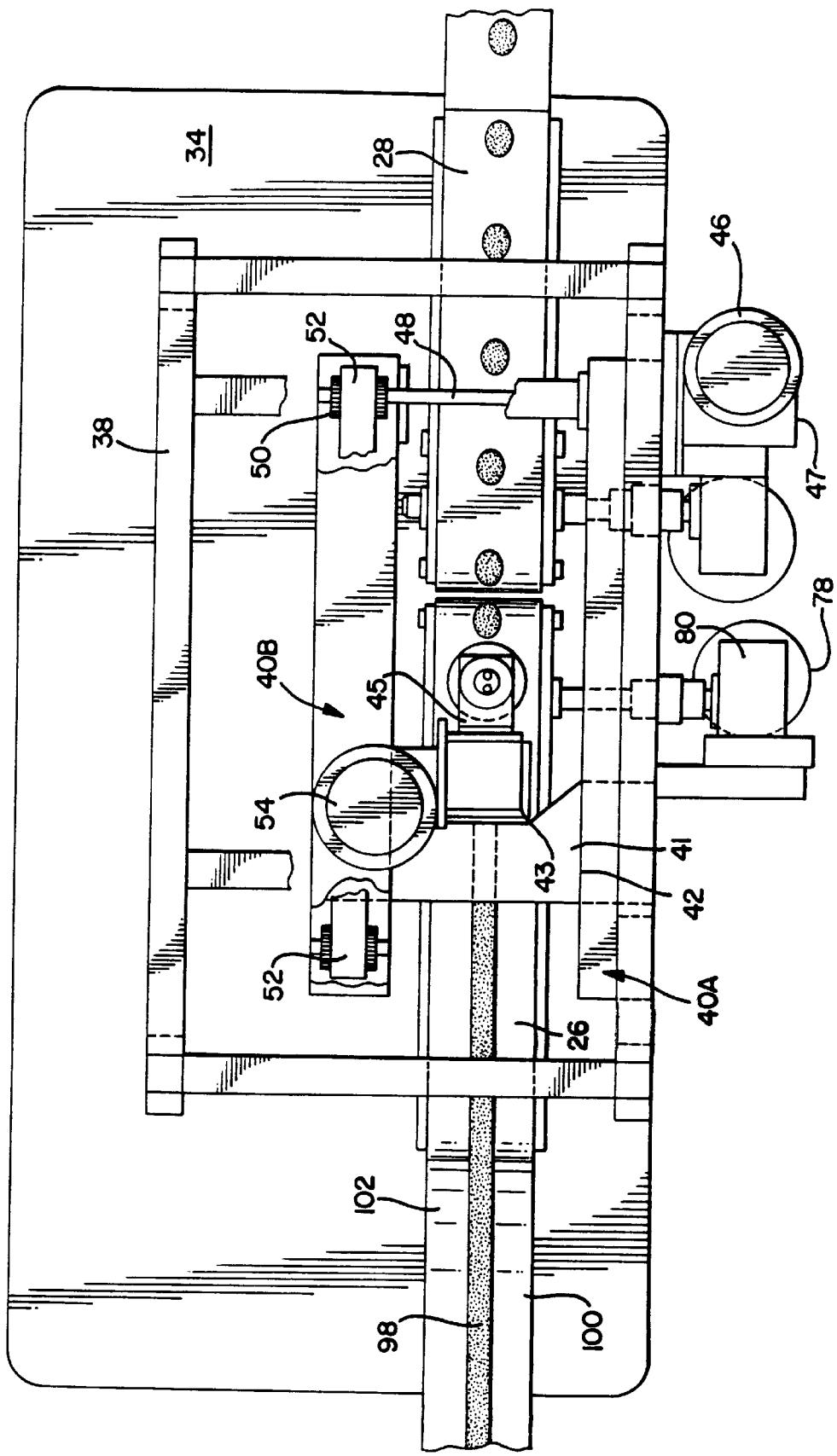

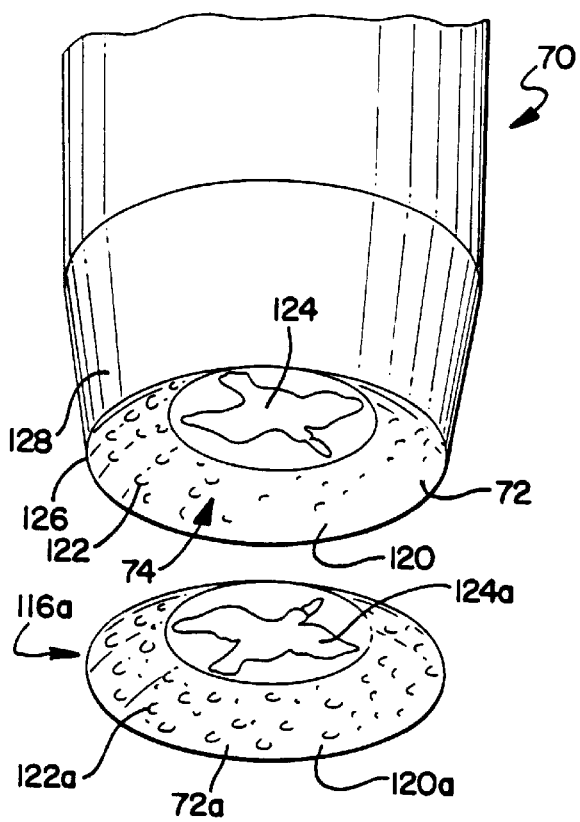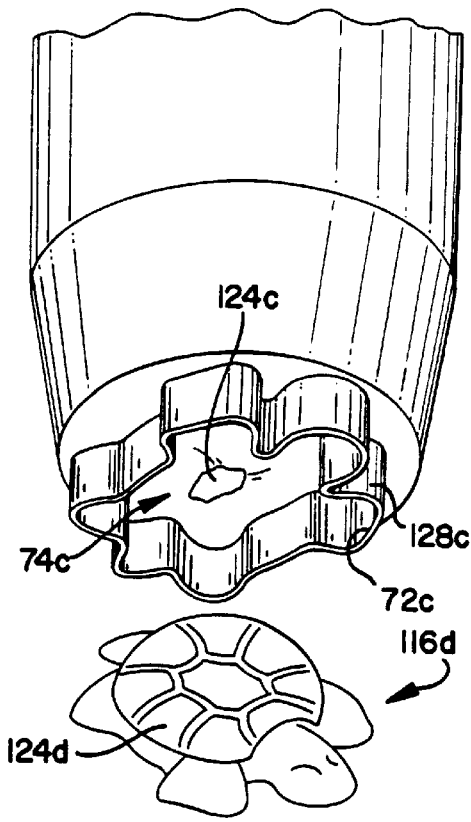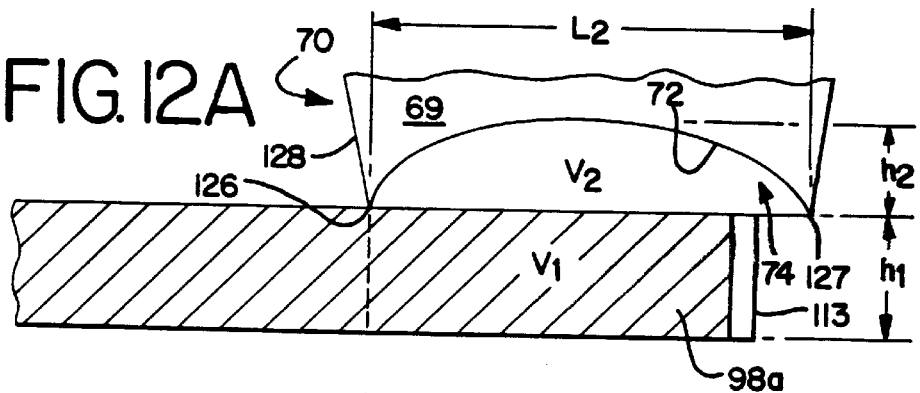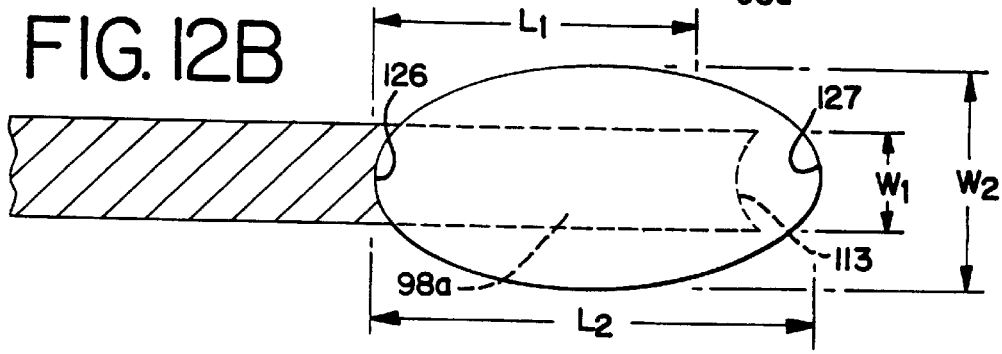

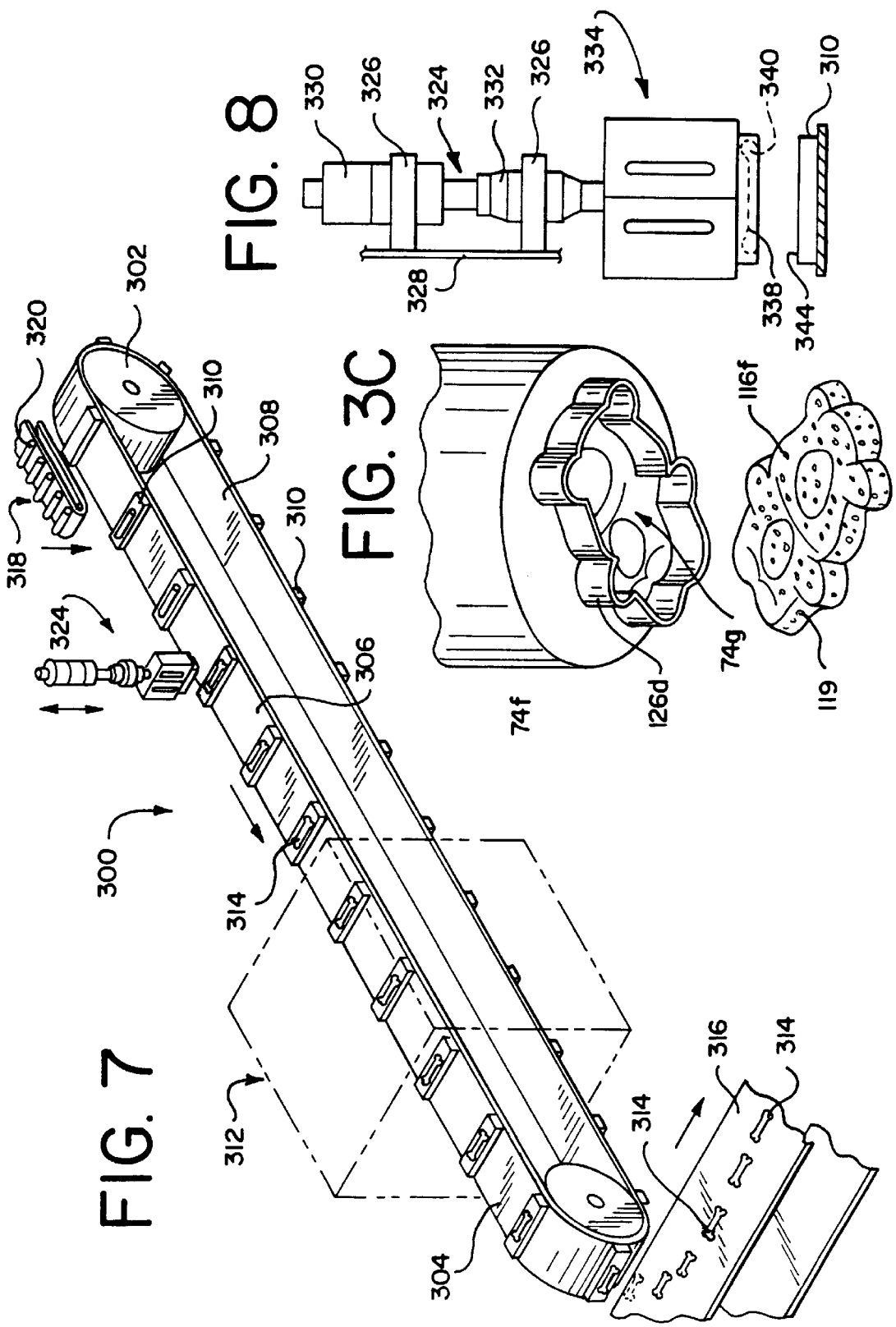

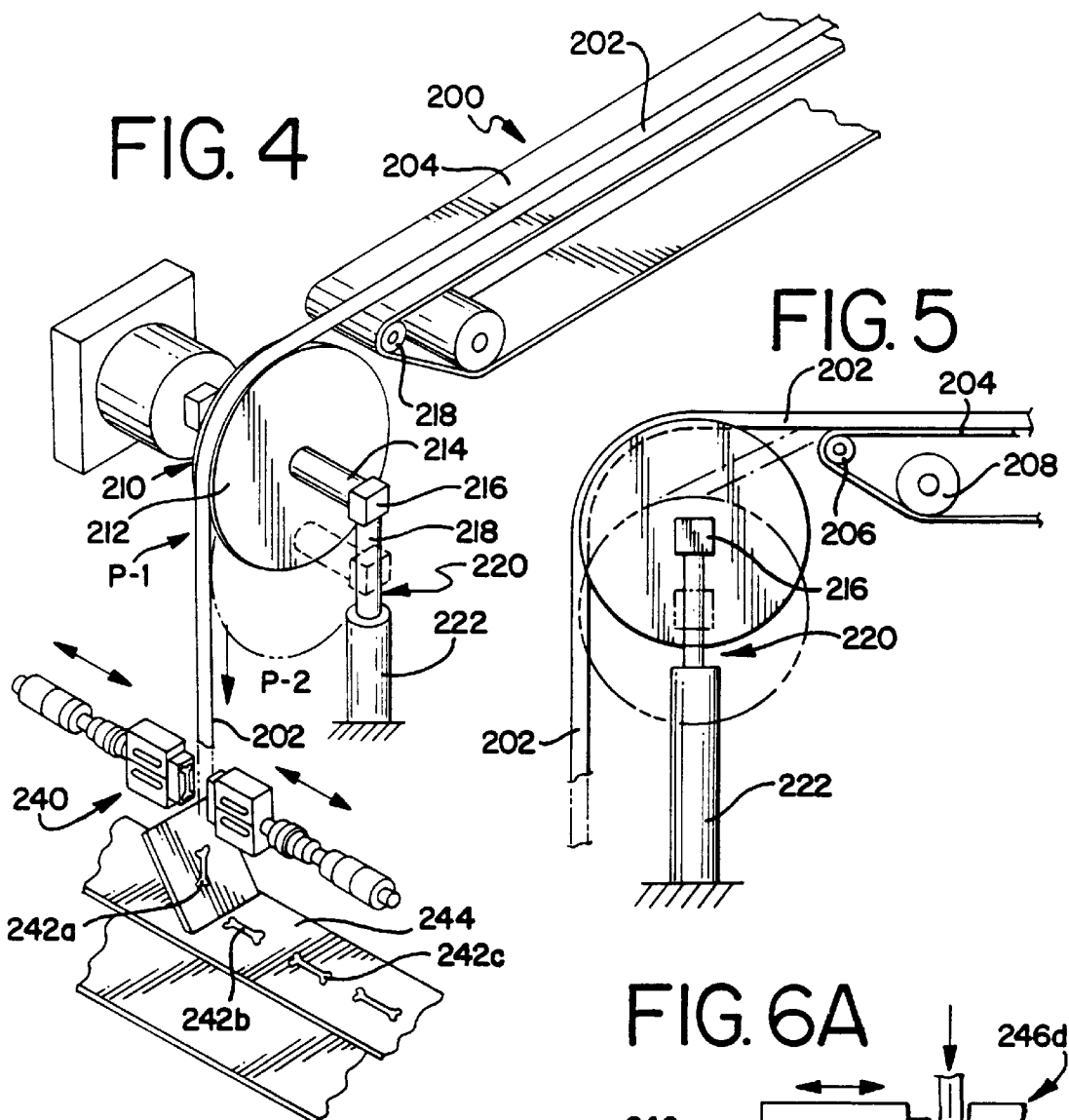
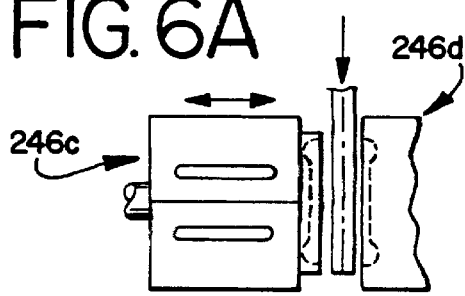
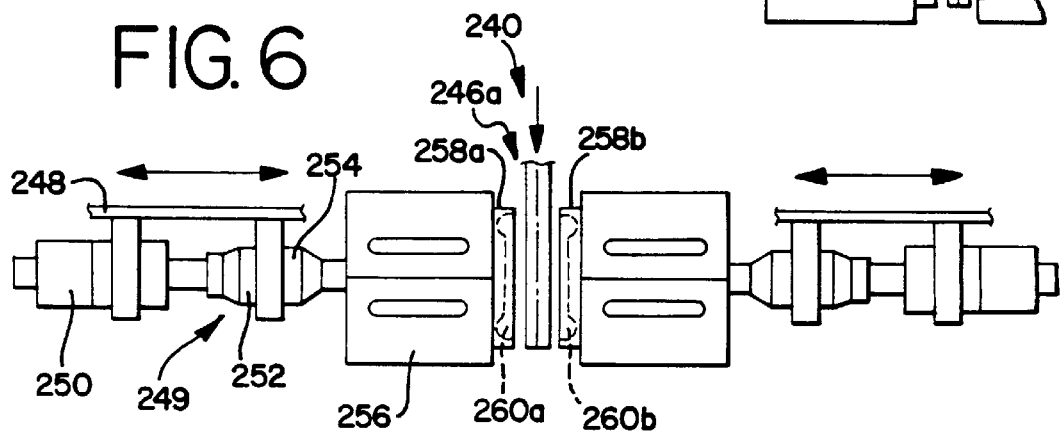

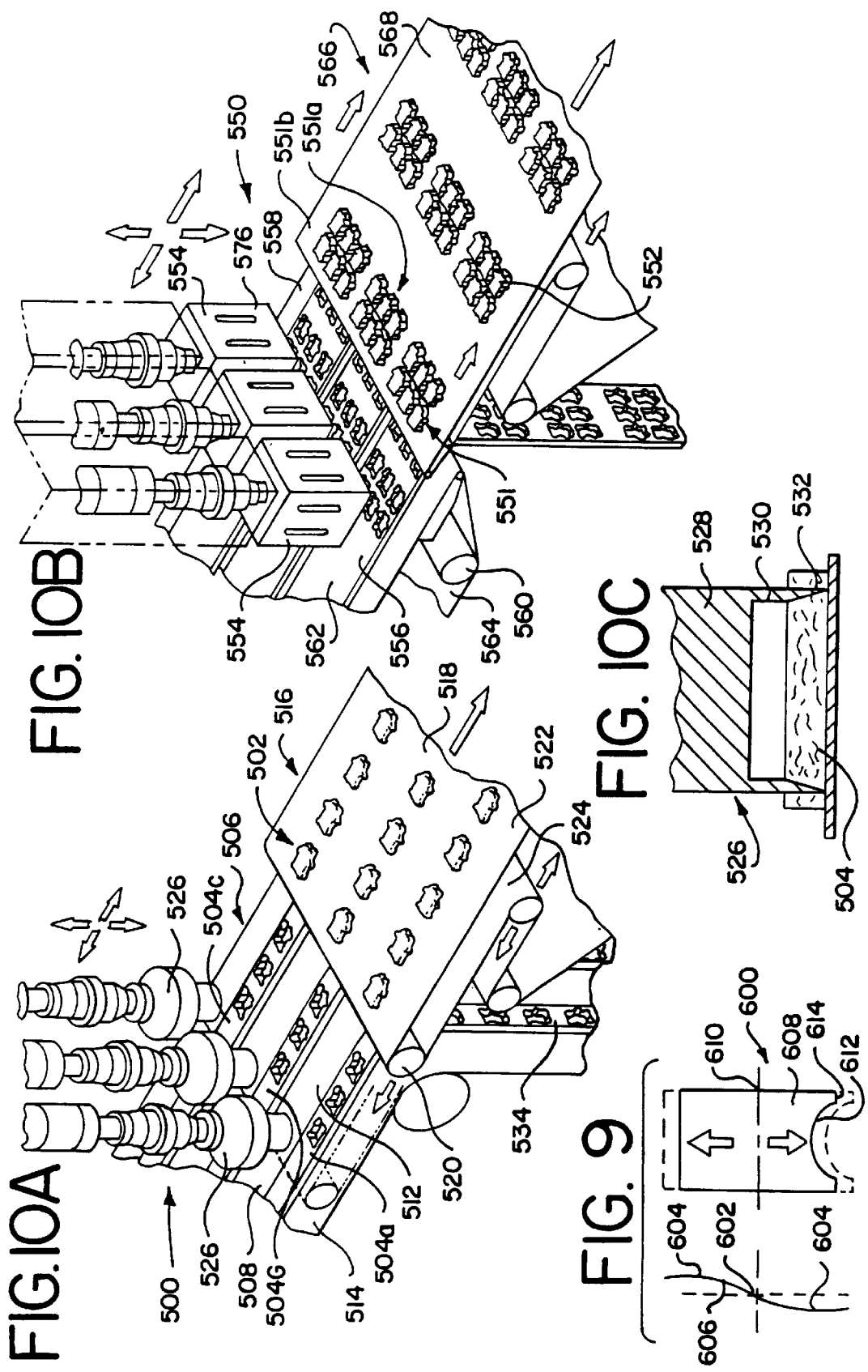

5,871,783

APPARATUS FOR ULTRASONICALLY FORMING CONFECTIONERY PRODUCTS

BACKGROUND OF THE PRESENT INVENTION

The present invention relates generally to the manufacture of food products. In one preferred form, the invention relates to methods and apparatus for cutting individual confectionery products from a slab or strip of product material into a product with a particular silhouette. In another form, the invention relates to methods and apparatus for both cutting and forming individual confectionery products from strips or ropes. Still further, the process can be used for simply forming products from pre-cut segments or other blanks of confectionery material, including imparting a relatively precise texture, finish or detail to such products. The products may, but need not be subsequently enrobed in chocolate or another coating.

The methods and apparatus are adapted to create individual confections which have the same taste, consistency and eating characteristics as those of the supply stock, i.e., they are "true analogs" of the supply stock. These methods and apparatus advantageously involve the utilization of ultrasonic energy.

The simplest form of apparatus involves cutting shapes from a slab or suitably wide strip of material on a flat surface to create products having a given silhouette but opposed flat sides. More complex forms of the apparatus use one or more forming tools, each of which includes a cavity having interior surfaces which will impart a desired shape and surface detail or texture to the finished product. Where advantage is taken of a number of features of the invention, a continuous extruded strip or "rope" of confectionery material is continuously advanced and then intermittently engaged by a cutting and forming tool whose cutting edges and interior surfaces vibrate ultrasonically at a desired amplitude. As used herein, "tool" simply means the portion of an ultrasonically energized apparatus that cuts or imprints a shape to the product.

This enables a finished product of a desired shape and surface texture to be accurately formed by the tool and then released from the tool without having any residue from the product adhere to the interior of the tool, and without affecting the sensory characteristics of the product. The apparatus and methods can be used to create products which are the true analogs of other products made from the same ingredients but shaped or sized differently.

Where the cutting and forming tools are formed and sized appropriately, and moved in a desired sequence, and where the cross-section of the confectionery stock is controlled properly, the process can achieve so-called "flashless molding" of product and also virtually or completely eliminate scrap or the like by forming the entire strip into individual products, without leaving a web or other residue from which the individual pieces were formed.

Many commercially produced confectionery products, such as, for example, candy bars, are formed by providing a slab which is then slit into multiple strips or what are sometimes termed "ropes." These strips or ropes are cut into individual lengths and enrobed with a continuous coating, such as, for example, chocolate. Such cutting steps can be carried out at high speed but these steps do not customarily involve forming the product into any shape except that of simple geometric figures, usually a parallelepiped or rectangular bar.

Although it is known to be possible to form unusual shapes and to impart a great variety of surface finishes or textures to candy products, this is not able to be done with most candy products on a rapid, continuous basis. This is because such shapes are normally created by molding, which involves melting the candy product and allowing it to re-solidify.

In the candy business, a great deal of research and effort has been undertaken in an attempt to create products which have taste, consistency and eating characteristics of a particularly desired kind. Thus, candy bar centers are commonly made as layered products and include a variety of materials each having its own characteristic taste. These ingredients include nuts of various kinds, fruit inclusions, coconut, peanut butter, nougat, caramel, most or all of which are layered and then enrobed in dark or light chocolate, or the like. It has been found through research that the mere presence of the same or similar ingredients in two different products is not enough to ensure that they will have the same taste, consistency and eating characteristics.

Thus, if the ingredients in one product are arranged in distinct layers, and in other products the same ingredients are simply intermixed, consumers will very often strongly prefer one product and not the other, in spite of the virtual identity of their ingredients on an overall basis. Many manufacturers have been unable to offer truly analogous products in shapes which differ significantly from those in which the products are customarily made. Accordingly, there has been a desire in the industry to be able to provide different versions or true analogs of particular, commercially popular candy bars in shapes different from their usual prior shapes. By "true analogs" as used herein is meant a product which does in fact have the same formulation, taste, consistency and eating characteristics as an original or reference product.

Assuming that a product itself could be made into two or more analog forms, each having significantly different shapes, another question is whether the equipment used to make such analog products could be readily incorporated into existing production lines.

Consequently, the operational flexibility that could be achieved by simply inserting the apparatus necessary to make an analog product into a production line that need not otherwise be modified would be a significant advantage in the industry.

While it is known that three dimensional products or those with complex detail or surface texture can be formed from continuous slabs of material as described above without encountering the above-referenced difficulties to an extent considered significant, these known manufacturing methods have several of their own drawbacks. Such methods often termed "flex molding," for example, are expensive and complex.

Flex molding is so-named because the molds which actually form the product are made from a flexible material, such as rubber. Consequently, it is possible to impart a somewhat complex decorative or like shape to the product and to remove a product, even one including undercuts or complex surface shapes from the mold as long as the mold sidewalls are flexible enough to be removed from the product without damaging it. However, there are a number of drawbacks to this method. First, it involves fluent, plasticized, or even liquid state products, and such liquid state products cannot by their nature be true analog products. The time required to allow products to solidify sufficiently to allow their removal is a process requirement that militates strongly against high production rates.

The size and complexity of flex molding equipment makes it expensive, causes it to occupy a great deal of space and makes it difficult to integrate into existing process equipment. Maintenance in some cases is difficult and expensive.

At least one other prior art method has presented certain disadvantages and drawbacks. Among these are problems of adhesion between the tool cavity interior or other forming surface that can become very significant. Even the most minor amount of adhesion will prevent complete product release, and in this case, deposits can progressively build up until an unacceptable level of residual material is present. Then, the process must be stopped to clean the forming surfaces. Anything hampering the continuity of such a process is clearly a serious drawback.

Problems continue to arise in the confectionery industry when it is necessary to cut individual pieces from continuous slabs, strips or extrudable ropes of products. Another aspect of the difficulty in cutting pieces relates to commercially produced frozen confections such as ice cream or frozen yogurt. The present invention allows effortless cutting of slabs, strips or extrudable ropes without producing distortion or adhesions, even where there are inclusions such as nuts, bits of fruit and the like.

In view of the foregoing and other disadvantages and the failure generally of the prior art to provide optimum methods and apparatus for forming individual food products from continuous strips or slabs, it is an object of the present invention to provide improved methods and apparatus for this purpose.

Another object of the present invention is to provide an improved apparatus and method for simultaneously cutting and forming confectionery products such as, for example, candy bars.

One other object of the present invention is to provide an apparatus which will rapidly and readily cut a product having a given silhouette from a continuous web of material.

A further object of the present invention is to provide improved methods and apparatus for cutting and forming frozen confectionery products, with or without inclusions.

A still further object of the present invention is to provide methods and apparatus for ultrasonically cutting and forming three dimensionally shaped and/or surface textured or embossed confectionery products, both "frozen" or "ambient" ("non-frozen").

Another object of the present invention is to provide an improved method and apparatus for ultrasonically energizing one or more "acoustic tools" (such as an ultrasonic horn) used to cut and form intricately shaped, surface textured confectionery products from a continuous slab, rope or strip.

A further object of the invention is to use an acoustic tool for forming confectionery products from pre-cut, metered, or dosed portions of confectionery stock.

Yet another object of the invention is to provide an improved method and apparatus for minimizing distortion of layered feedstock materials during the forming process.

A further object of the invention is to provide a method and apparatus for cutting and forming intricately shaped and/or textured confectionery products in a single step, such methods and apparatus employing ultrasonic energy and specially designed forming tools.

A still further object of the present invention is to provide an improved method and apparatus for cutting individual confectionery products from a strip or extruded rope of confectionery stock and simultaneously forming individual products by contacting the supply of material with a cutting and forming tool having ultrasonically vibrating surfaces.

Yet another object of the present invention is to provide a method and apparatus for forming confectionery products which readily fill a cavity of a complex shape to provide a product that is substantially free of voids.

A further object of the present invention is to provide a method and apparatus whereby confectionery products of a given height, length and width can be produced from a continuous strip of confectionery stock having a different height and width, all without disturbing the taste, consistency and eating characteristics of the feedstock.

An additional object of the invention is to provide an improved cutting and product forming system for making selectively shaped confectionery products, which system can easily be integrated into or installed on existing production lines with a minimum of capital expenditure and which can enable such production lines to achieve desirably high production rates, especially in relation to flex molding techniques and to maintain or improve quality.

Another object of the present invention is to provide a method and apparatus for substantially reducing the forces required to form novel confectionery shapes, thereby increasing the life of tools and other process equipment, and enabling products to be made at higher rates without increased cost.

A still further object is to provide a process that is capable of concurrently producing both regular or conventional shapes as well as novelty shapes from the same feedstock, preferably on side-by-side lines using basically the same equipment.

Yet another object of the present invention is to provide a confectionery forming method and apparatus wherein ultrasonic energy is used to achieve movement of the cavity defining surfaces to ensure that the product is fully and completely released from the mold thereby eliminating build-up of product residue on the working faces of the forming tools.

A further object of the invention is to provide a method of operating an ultrasonically energized tool so as to achieve the required energy transfer without waste of energy or degrading or damaging to the product or the tooling.

Another object of the invention is to provide methods for operating ultrasonically energized equipment which include selectively varying the amplitude of vibration undergone by certain of the product contact surfaces during the cutting and forming cycles so as to utilize ultrasonic energy in the most effective way.

A still further object of the invention is to provide a method of imparting ultrasonic energy to an ultrasonically vibrated mold in a definite sequence so as to achieving desired or necessary plasticity and secure complete mold release without unduly raising the surface and/or interior temperature of the product.

An additional object of the present invention is to provide methods for utilizing pairs of opposed, cooperating, ultrasonically energized forming tools in a synchronized relation to form products of complex shapes, including full three-dimensional shapes, in a continuous process.

Another object of the invention is to enable the same process equipment to be used in forming finished products such as fudge or chocolate products, as is used in producing toffee or other shaped centers for a subsequently applied final coating such as chocolate.

A further object of the invention is to provide a molding tool which will cut profile or silhouette shapes from a slab of continuous confectionery feedstock, creating a product with a flat top and bottom and a contoured outline or silhouette formed by a precise, ultrasonic vibration-assisted cutting action.

Yet another object of the invention is to provide a method of substantially "flashless" molding of confectionery products from a continuous strip, rapidly forming a succession of individual products and utilizing the entire volume of the strip so that no residual web or non-product residue is created.

Another object of the invention is to utilize a multiple cavity tool to produce plural flashless, silhouette products from a slab to leave a web of minimum volume that can be recycled.

Yet another object of the invention is to use an array of single or multiple cavity tools for producing silhouette products or cut and molded products from a slab of confectionery material.

A still further object of the present invention is to provide a method of incorporating the intermittent motion of a pair of opposed tool sets into a process that includes supplying feedstock in continuous or rope form in order to make individual products from such continuous rope without creating waste, leftovers, and without unduly deforming the feedstock.

The foregoing and other objects and advantages are achieved in practice by providing a method which includes using one or more ultrasonically energized forming tools to create individual confectionery products from a continuous slab of product by cutting and forming such individual uses through the use of a desired motion sequence, and the use of the ultrasonic energy to plasticize the product and impart a desired shape and surface texture thereto at high speed while securing complete release of the product from the forming tool.

The objects are also achieved by providing control of the amplitude of the ultrasonic energy supplied to the tools during product forming operations and by coordinating the motion sequence of some of the process equipment with other process equipment to achieve substantially flashless molding. In addition, the invention provide methods and apparatus involving the use of a reciprocating tool moving in cooperation with an indexable companion tool or anvil as a part of a continuous forming process.

The manner in which the foregoing and other objects and advantages are achieved in practice will become more clearly apparent when reference is made to the following detailed description of the preferred embodiments of the invention set forth by way of example and shown in the accompanying drawings, wherein like references numbers indicate corresponding parts throughout.

BRIEF DESCRIPTION OF THE DRAWINGS

FIG. 2 is a top plan view of the apparatus of FIG. 1, showing certain of the structural and operational aspects thereof;

FIGS. 3A, 3B & 3C illustrate detailed forms of confectionery products respectively formed by associated cutting and forming tools having shaped and textured interior forming surfaces;

FIG. 4 is a perspective view, partly diagrammatic in nature, showing the use of a pair of opposed, ultrasonically energized tools used to form individual products from a continuous strip of confectionery material that is advanced and formed intermittently;

FIG. 5 is a fragmentary elevational view of a portion of the apparatus of FIG. 4;

FIG. 6 is a front elevational view of a pair of the ultrasonically energized, reciprocable tool sets of the invention forming a part of the apparatus of FIG. 4;

FIG. 6A is a fragmentary elevational view similar to that of FIG. 6, but showing one reciprocable tool set and one fixed tool set;

FIG. 7 is perspective view, partly diagrammatic in character, showing a further modified form of apparatus, using a reciprocating, ultrasonically energized tool periodically moved into registry with one of a series of intermittently advanced anvils;

FIG. 8 is an enlarged front elevational view of the ultrasonically energized tool and one of the anvils used with the apparatus of FIG. 7;

FIG. 9 is a schematic view illustrating how ultrasonic energy applied to a forming tool creates low-amplitude, high frequency movement of the tool forming surfaces, and also schematically showing a standing wave with node and anti-node portions;

FIG. 10A is a perspective view of one form of an apparatus made according to the invention and utilized to create multiple rows of single silhouette products from multiple continuous slabs of confectionery stock, leaving multiple continuous webs of reusable confectionery stock;

FIG. 10B is a view similar to that of FIG. 10A, but showing multiple rows of ultrasonically energized cutting tools used to form multiple groups of cut products from continuous slabs of confectionery stock, leaving plural, recyclable residual webs of confectionery stock;

FIG. 10C is a diagrammatic vertical sectional view of a portion of the apparatus of FIG. 10A and showing an ultrasonically energized cutting tool in a position of use relative to a slab of confectionery stock;

FIGS. 12A and 12B are diagrammatic illustrations of the relationship between the length, height, width and volume of a portion of a confectionery feed strip and the volume of a finished product made from such feed strip;

DESCRIPTION OF THE PREFERRED EMBODIMENTS OF THE INVENTION

The apparatus of the present invention is capable of being embodied in a number of forms, and the inventive process includes several methods all falling within the general ambit of the inventive concept.

Accordingly, by way of example only and not by way of limitation, a description will be given of several different forms of apparatus, each capable of practicing the invention and each having individual components capable of being varied in constructional details and arrangement. Illustrative methods, the steps of which may also be modified or altered somewhat in use, are also described herein.

Figure 1:
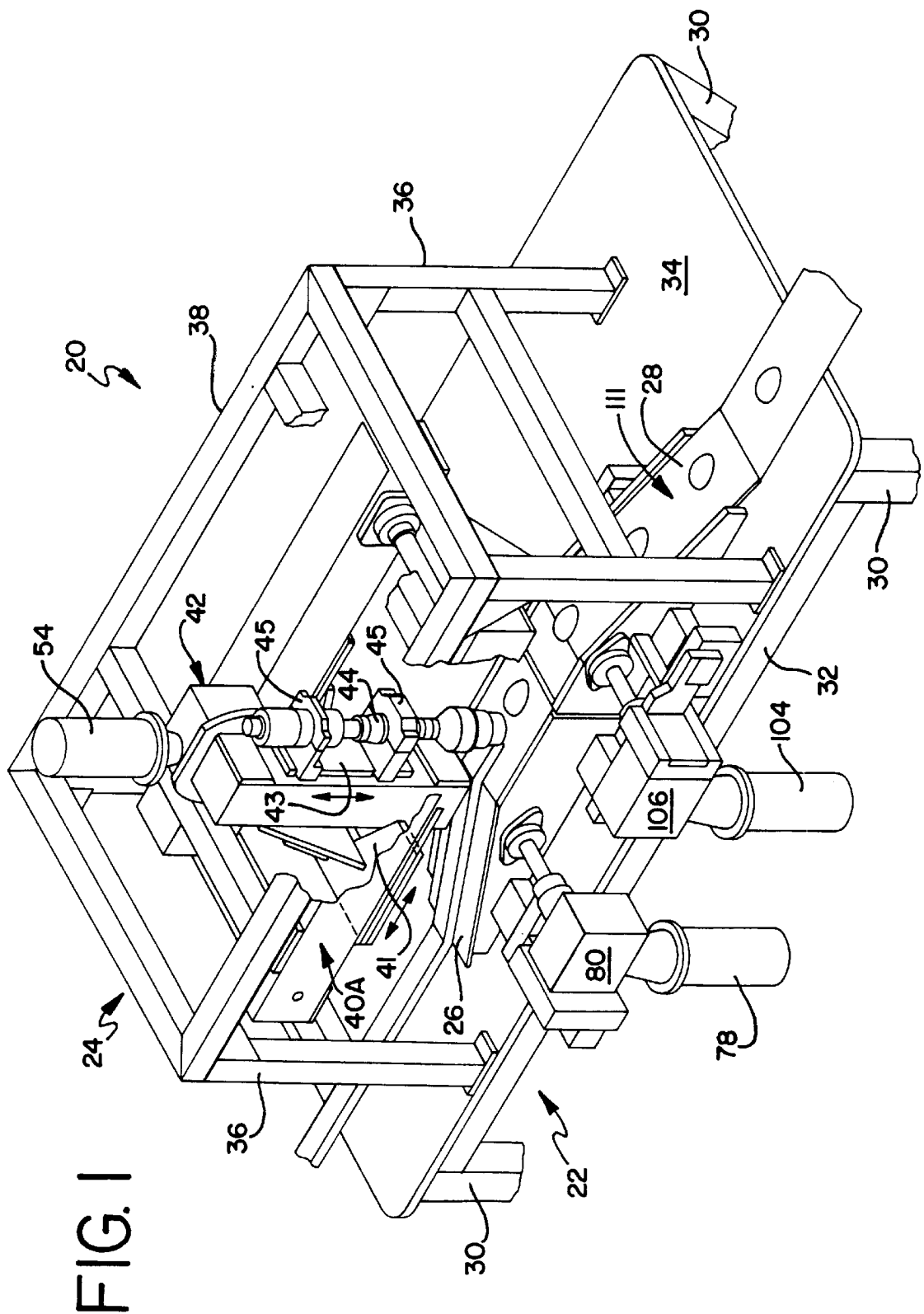
FIG. 1 is a perspective view, with portions broken away, showing certain important elements of a preferred form of apparatus for forming individual confectionery products from a continuous supply of confectionery feedstock.
Figure 1A:
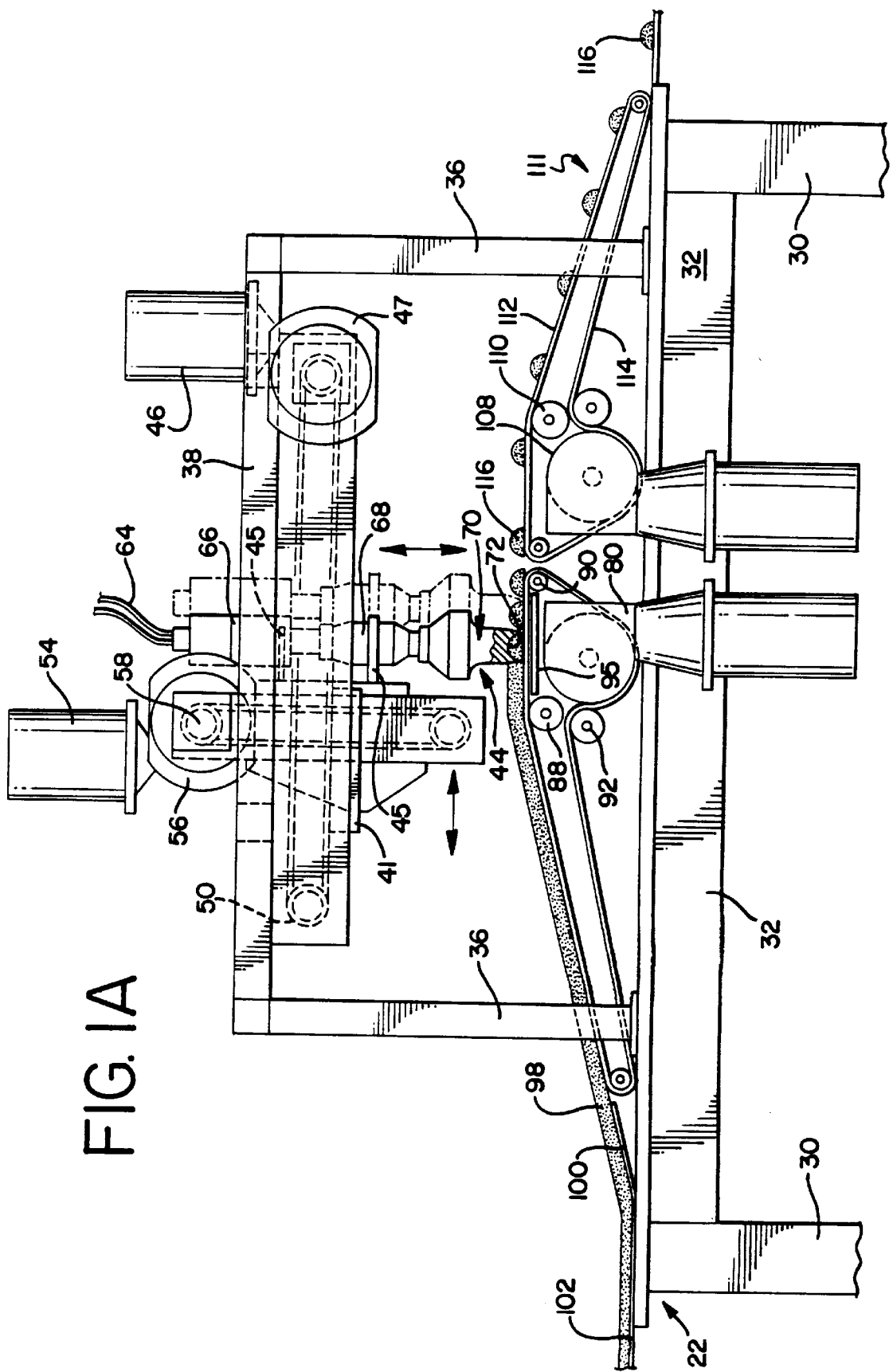
FIG. 1A is a side elevational view of the apparatus of FIG. 1.

Referring now to the drawings in greater detail, FIGS. 1, 1A and 2 show the invention to be embodied in a confectionery product cutting and forming apparatus generally designated 20 and shown to include a lower support frame portion generally designated 22, an upper frame section generally designated 24 and a pair of conveyor units, a food product input conveyor 26 and a food product output conveyor 28.

According to the invention, the lower frame 22 includes plural spaced apart vertically extending legs 30 supporting substantially identical front and rear transverse cross members 32, on which a tabletop 34 is positioned. The upper frame 24 includes vertical supports 36 and horizontal members 38, such members being adapted to receive and position a pair of substantially identical horizontal actuator assemblies generally designated 40A, 40B. The actuators 40A, 40B reciprocate a support plate 41 which in turn supports a vertical actuator generally designated 42 for a support plate 43 to which are attached a pair of spaced apart brackets 45.

According to the invention, the actuators move the support plate 41 with a laterally reciprocating motion, i.e., to the left and right as shown in FIGS. 1, 1A and 2. A drive arrangement for the actuators 40A, 40B includes a traversing motor 46 driving a reduction gear box assembly 47 having a drive shaft 48 that rotates one carrier gear 50 in each actuator 40A, 40B. The gears operate toothed timing belts 52 (only one shown in FIG. 2), the lower runs of which are attached to the support plate 41.

According to the invention, the vertical actuator includes a servo plunge motor 54, a gear box 56 cooperating in use with a vertical actuator drive shaft 58 that also moves a reciprocable timing belt 62 to which the support plate 43 and mounting brackets 45 for the ultrasonic stack 44 are attached.

Referring particularly to FIGS. 1, 1A and 2, it will be noted that a power supply (not shown) furnishes electrical energy through a radio frequency cable 64 to a converter 66 wherein high frequency (20 KHz or higher) electric energy is transduced into vibratory mechanical motion, preferably by a plurality of piezoelectric transducer devices. The output of the converter 66 is amplified, if needed, in what is termed a booster assembly 68, which also provides a second clamping point at its nodal ring for mechanical stability. The output end face of the booster 68 is secured by suitable means to the upper or input end of an ultrasonic horn generally designated 70. The horn 70 includes contoured surfaces 72 forming a product shaping cavity 74.

Referring again to FIG. 1 and in particular to the input conveyor 26, this unit is shown to include a drive motor 78, a reduction gear transmission 80, a primary drive roller 82 that is operative to advance a continuous serpentine belt generally designated 84 which is trained around a plurality of guide pulleys 86, 88, 90, 92. When the belt 84 is disposed as shown, there is a lower run 94 and an upper run 96 which in use is trained over a backing plate 95 and which run 96 in turn supports a continuous supply or strip of confectionery feedstock 98. Prior to coming in contact with the belt forming the upper run 96 of the conveyor 26, the strip advances along one or more intermediate supports 100, 102 which may optionally include or be formed from a plurality of overlapping rollers (not shown in detail) or the like.

A mixer/extruder, or other source (not shown) may be used to form a continuous supply or slab of confectionery material having a uniform cross-section and a self-sustaining shape, arising by proper temperature control both in the case of an ice cream or other frozen confection, and in the case of a candy bar or like product. It will be understood that the continuous strip 98 may be only one of several strips formed from a slab of much greater width but of the same height and consistency. In other words, the process may call for forming a slab from which several strips are cut and advanced as indicated herein.

Referring now to the second or outfeed conveyor 28, this unit is shown to be analogous to its counterpart on the infeed conveyor side, with the unit 28 having a motor 104, gear reduction unit 106, a drive roller 108, plural guide rollers 110 (only one numbered), and a drive belt generally designated 111 forming upper and lower runs 112, 114 respectively. This belt 111 is substantially identical to its counterpart except that, as will appear, it is intentionally driven at a somewhat higher speed. In keeping with the invention, the cavity portion 74 of the tool 70 is used to form a plurality of substantially identical, individual confectionery products 116 from the continuous rope or strip of confectionery material 98. The manner in which this forming is done will now be described in detail, reference being had in particular to the illustrations of the product in FIGS. 3A, 3B and the schematic or flow diagram FIG. 16. The manner of sizing and shaping the cavity for the product is also illustrated in FIGS. 12A and 12B.

Referring now to FIG. 3A, there is shown an ultrasonic horn generally designated 70 having a surface 72 forming a product-shaping cavity 74 within its lower portion.

Where the cavity 74, merely by way of example, has an inner sidewall 72 with some relatively smooth portions 120, a series of decorative embossments or the like 122 and a identifiable relief FIG. 124, a finished product generally designated 116a made using this tool 70 will have the reverse image of these elements, including a reverse element 124a of the relief image 124, a smooth portion 120a on the product sidewall 72a and debossments or depressions 122a formed by the counterpart embossments or image formations 122 on the walls 72 of the cavity 74. According to the invention, a very thin knife-edge cutting section 126 is provided in the places where an exterior wall segment 128 approaches and virtually meets a counterpart interior wall surface 72 of the cavity 74, typically at the trailing edge of the tool.

FIG. 3B shows another form of cavity generally designated 74c having a trailing, sharp cutting edge 126c defined by the junction of exterior surfaces 128c and inner cavity surfaces 72c. In the illustrated embodiment, a turtle FIG. 116d is shown to be produced by the turtle shape of the cavity 74c. In addition, a decorative relief surface 124d is shown to be formed on the figure by counterpart formations 124c within the cavity 74c.

FIG. 3C shows still another form of tool 74f having a cavity 74g adapted to form a product 116f wherein the cutting edges or surfaces 126d are used to form vertical sides 119 of the product similar to those of the silhouette type.

The foregoing descriptions illustrate that individual cavities may have irregular or complex shapes that may include relief and/or recessed portions adapted to create on the formed piece respectively depressions and/or relief figures, and that any part or all of the cavity surface may be textured as desired to make the preferred form of product.

If the pieces are to be sold as formed, the relief or finish surface may be fine or coarse. If the pieces are to be enrobed, the nature and extent of surface detail will be selected so that a desired image will remain visible through the coating.

Figure 16:
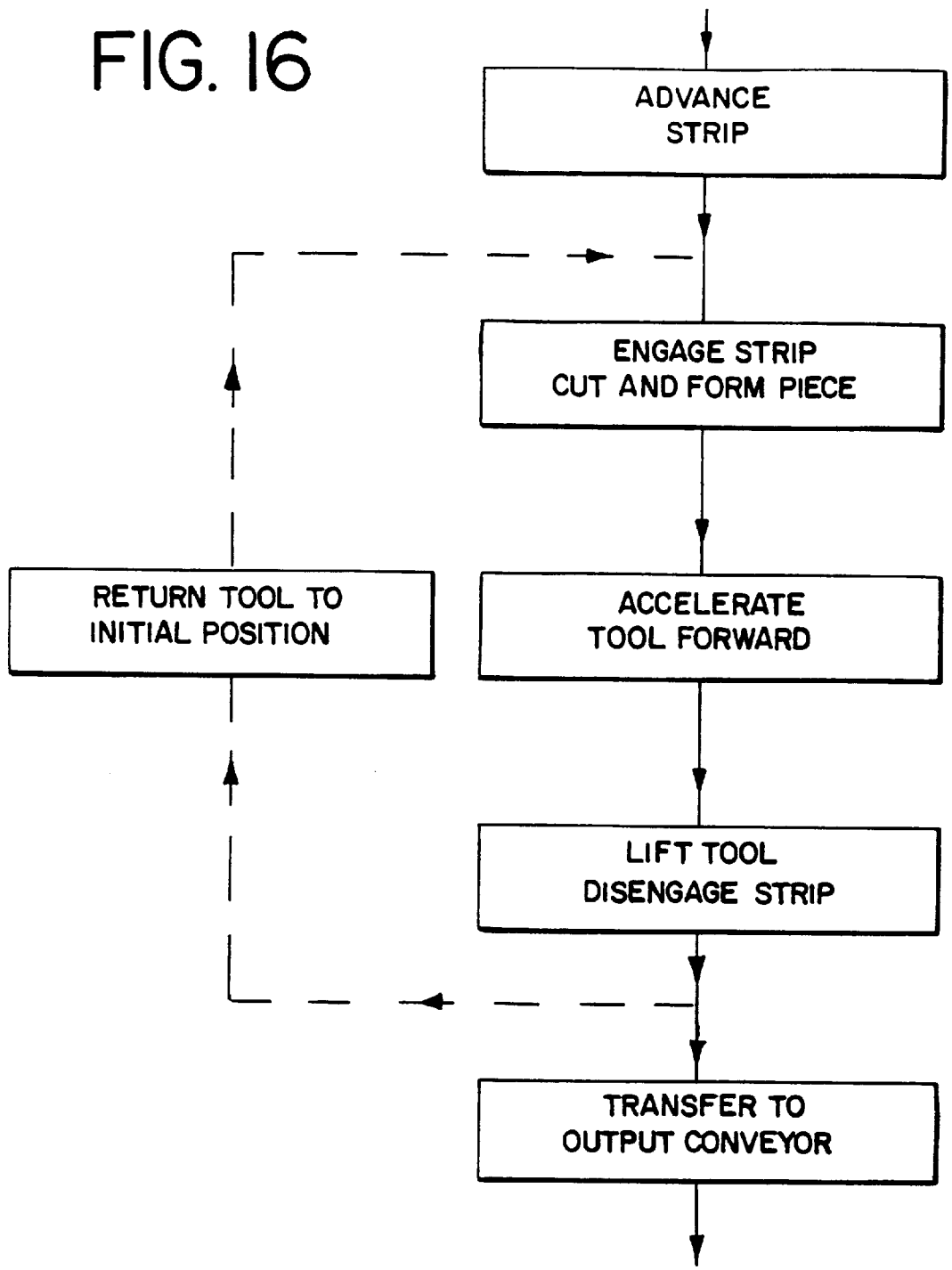
FIG. 16 is a block diagram illustrating the various steps of one preferred form of process embodying the invention.

Referring now to the operating sequence and method of the apparatus of FIGS. 1 and 2, FIG. 16 is a block diagram illustrating the process of the invention in a general way. As shown in the first block, a strip of material is advanced at a predetermined rate. The next step comprises moving the tool 70 at a synchronous rate with the advancing strip and then, while the tool continues to advance, moving it downwardly with a rapid motion into contact with the strip 98. Here, the product is formed when the tool moves through the strip segment and meets the upper run 96 of the belt 84, where the belt is supported by the backing plate 95. In the next step, the tool remains in a down position and is accelerated forwardly away from the remainder of the strip 98 for a brief time before the tool is raised and returned to the initial point. Finally, in the last step, the previously formed, released, and separated piece 116 is transferred to the faster moving output conveyor for further separation while at the same time, the tool 70 (and in fact the entire stack) is lifted and rapidly reset to its initial position before beginning the synchronous forward-and-down movement sequence described above. The apparatus then repeatedly carries out the cycle just described.

In the machine shown in FIGS. 1, 1A and 2, therefore, as the strip of material 98 is advanced, the transverse and vertical movement mechanisms for the ultrasonic stack 44 are both actuated. The stack is advanced as its support plate 41 moves it forward under the control of a programmable servo motor or otherwise such that its translational speed is identical to the advance speed of the infeed conveyor belt 84. Consequently, beginning in an initial part of the stroke which corresponds generally to a flat segment 99 of the conveyor illustrated as just above the backing plate 95 lying between rollers 88 and 90, the tool 70 moves downwardly at a rapid rate, stroking to a position wherein its cutting edge 126 (FIG. 3A) is substantially in contact with the upper surface of the belt 84.

The vertical travel mode of the servo driven plunge motor 54 moves the plate 43 to accomplish this movement sequence. As will be described in detail later, this movement sequence simultaneously cuts and forms a shaped product 116 through a combination of compressive force and vibrational energy transfer, without affecting the texture or sensory characteristics of the product.

As the cutting edge 126 approaches or just contacts the belt 84, the traversing motor 46 accelerates the belt 52 controlling movement of the support plate 41, advancing the edge 126 slightly in respect to the linear speed of belt 84. This desirably separates the just-formed piece 116 from the leading edge 113 (FIG. 12A) of the strip or rope of confectionery product 98.

The individually formed product 116 and the leading edge 113 of the strip are now moving forward at the same speed but are slightly spaced apart. Thereupon, with continued operation of the input conveyor 26 at its rate and the continued operation of the output conveyor 28 at its own higher rate, an overdriven velocity is created in the output belt 111. The articles 116 just formed are thus picked up, further separated and moved away to a remote section of the table 34, as shown at the right hand sides of FIGS. 1 and 2.

As the ultrasonic stack 44 is lifted to free the product 116 from the interior of the cavity 72, the traversing motor 46 actuates the mechanism to rapidly reset the stack to an upstream or far left position as shown in FIG. 1. The advancing (or left to right as shown in FIG. 1) synchronous motion is then the first step in a new cycle, and so on.

According to the invention, and as will be described elsewhere herein, the movement profile of the tool 70 is such that its cutting edge 126 will contact the continuously advancing rope of confectionery product 98 a distance spaced inwardly of its leading edge an amount sufficient to cut an individual portion of a desired volume. The movement sequence thus described is a simple one which is periodically repeated, with each individual confection being made from a predetermined volume of the strip or other supply of confectionery stock.

According to the preferred form of the invention, a servo motor or other programmable sequence drive arrangement is provided so that individual portions are made, each of which is of an identical size, and the advancing and retreating motion as well as the downward or plunge stroke of the ultrasonic stack are coordinated such that a piece of the desired volume, but different shape, is cut with each cutting sequence and then molded into a different shape of identical volume. As will appear, this enables the process to be carried on without leaving a web or other waste in what is essentially a flashless, rapid forming operation not requiring any compromise in the analog characteristics of the finished product.

Referring now to a corollary of the concept that flashless molding is possible, and that waste formation can be eliminated, reference is made to FIGS. 12A and 12B. Here, FIG. 12A is an elevational view, partly in section and showing the bottom portion of the tool 70 having interior surfaces 72 forming a cavity generally designated 74, shown in FIG. 12A to possess a volume $V_2$. FIG. 12A shows that the cavity 74 is also defined by and includes a trailing, cutting edge portions 12G and a leading edge 127, so named in view of the travel direction of the stick or strip 98 of confectionery product.

As shown in FIG. 12A, the cavity 74 has a length $L_2$. A selected length $L_1$ forms a strip segment 98a that is shown to have a volume $V_1$ which in the illustrations of FIGS. 12A and 12B is shown to result from its also having a height $H_1$ and a width $W_1$. In the illustrated form, $H_1$ is greater than the maximum height $H_2$ of the cavity 74 and the width maximum $W_2$ of the cavity 74 is greater than the width $W_1$ of the strip 98.

Given that the volume $V_2$ of the cavity 74 is able to be predetermined by simple volumetric measurement, as having, for example, a volume of 25cc, then theoretically, a flashless product could be made if an individual piece of the confectionery strip 98a is of a suitable cross-section, such as a rectangular cross-section, and also has a volume of 25cc. This is what is in fact done according to the present invention, wherein, given the volume $V_2$ of the cavity 74, the width, height and length of the strip segment 98a are selected so that its volume is the same as that of the cavity, and so that exact filling can be accomplished.

In this connection, it is customary to have the strip segment 98a somewhat higher, shorter, and narrower than the cavity to achieve precise results. In other words, the strip segment and cavity are shaped and sized so that the entire volume $V_1$ of the strip segment 98a will initially fit with the cavity. Since, after one cutting and forming cycle is completed, the leading edge of the strip of confectionery product 98 will have an arcuate configuration, when the process of cutting and separating is repeated, the leading edge will continue to have such configuration, and exact matching of the volume of the strip segment 98a and that of the cavity interior will result so as to permit precise flashless molding. Repetition can be accomplished in proportion to the ability of the process machinery to hold tolerances on the height and width of the strip. Experience has proven that this is very easily accomplished.

Accordingly, while the reforming of the entire volume of the product into a cavity of the same volume and a different shape renders it practical to achieve virtually 100% product utilization and to eliminate or at least significantly minimize generation of scrap, the invention can be practiced without using this capability. Thus, if the invention is used to produce silhouette products by using an ultrasonic tool in "cookie cutter" fashion from a slab of confectionery product, it is implicit, as will be discussed in connection with later examples, that desirable products can be made by a process wherein a web of unused product will still remain.

Referring now to FIGS. 4–6, another form of apparatus generally designated 200 is shown as being suitable for the practice of the invention. Here, there is somewhat schematically shown a process for extruding a rope 202 of a confectionery material from a given source (not shown). A feed belt 204 is trained over drive and guide wheels 206, 208 that are shown to be provided for advancing the rope 202 of just-formed product on a continuous basis. Such a continuous extrusion and advancement are considered one desirable and effective way to maintain the uniform cross-section of product which is desired for maintenance of quality.

The rope 202 of product travels over a groove formed in the outer margin 210 of a rotary feed wheel 212 journalled on an axle 214 that is supported by a bearing 216 at the upper end 218 of a shaft 220 moved by a linear actuator 222. The axle 214 is driven by a motor 215 such that the speeds of the feed belt 204 and the outer diameter of the wheel 212 are the same. The actuator 222 is moved controllably to intermittently alter the feed rate of the rope 202.

As shown in the phantom lines in FIGS. 4 and 5, the pulley or feed wheel 212 is movable between a solid line position $P_1$ shown in FIGS. 4 and 5 and a phantom line position $P_2$ also shown in FIGS. 4 and 5.

Referring again to FIG. 4 and also to FIG. 6, it is shown that sections of the rope 202 are formed into individual contoured products 242a, 242b, 242c, etc., by a cutting and forming apparatus generally designated 240. Each product 242a, 242b, etc. is substantially identical to every other product and all are carried away by the upper run 244 of a conveyor (not shown in detail).

Referring to FIG. 6, it will be noted that a pair of substantially identical but mirror image, left and right hand forming assemblies 246a, 246b are shown. The parts being essentially identical, only the parts comprising the left hand portion 246a are described in detail herein. In FIG. 6, a bracket 248 is shown schematically as being adapted to reciprocate an ultrasonic stack generally designated 249 comprising a converter 250, a booster 252, and a horn assembly 254 in a horizontal plane. The ultrasonic horn 254 is shown to include a carrier 256, a forming tool 258a having a contoured cavity 260a forming a part thereof; tool 258b has a cavity 260b. As shown, the cavities 260a, 260b resemble their counterparts shown in FIGS. 3A and 3B, and each includes contoured or otherwise desirably shaped inner surfaces and sharp cutting edges not shown in detail in FIG. 6.

In use, it is desired to move the two ultrasonically energized forming tools toward each other periodically to contact a desired portion 207 of the rope 202 of product disposed therebetween to perform a combination cutting and forming operation analogous to that described in connection with FIGS. 1, 1A and 2. In this instance, considering that two horns must be manipulated, it is strongly desired not to attempt to synchronize movement of both ultrasonic stacks with respect to a continuously advancing rope or stick of product. Hence, a compensating drive assembly of the type shown in FIGS. 4 and 5 is utilized to alter the feed rate of the rope 202 by changing a constant advance rate to an intermittent, advancing motion. This is accomplished by periodically moving the shaft 220 at an appropriate time and with an appropriate velocity such that the peripheral groove 210 of the pulley 212 rises vertically at a rate exactly equal to the advance rate of the belt 204. During the short period when this is occurring, forward motion of the end portion 207 of the rope 202 is arrested just as forming assemblies 246a, 246b carrying the tools 258a, 258b are moved together to form the product, and to begin their separation to permit the product to be ejected from the single cavity formed jointly by the two tool segments.

As the stacks are separated, the shaft 220 moves downwardly, in effect permitting the new leading edge of the rope portion 207 to move down, and in effect, feed another segment of the rope 202 to the forming tools. As the portion 207 completes the advancing movement, the shaft 220 is moved up again by the actuator 222, and the process is repeated.

The foregoing apparatus illustrates the application of the principles of the invention to the cooperative use of a multiple stacks of ultrasonically energized cutting and forming tools in the production of confectionery products. The size and shape of the rope relative to the configuration of the cavities and the size of the final product are able to be controlled in a manner analogous to that described above in connection with FIGS. 12a and 12b, or otherwise as described. Other continuous-to-intermittent motion devices may be used for the purpose described above, but the preferred apparatus is one of a type wherein the rope is supported throughout the major portion of its extent, with only a free end portion hanging down as shown.

If this were not the case, the cross-section of the rope 202 or other extruded shape might be deformed by undue gravitational-force elongation. The form of continuous-to-intermittent drive mechanism shown is merely one presently preferred form, it being understood that those skilled in the art are well aware that other mechanisms may be constructed and arranged for this purpose.

Where the two tools containing opposed cavities meet, a composite material, such as a carbon fiber material, may be bonded to the end face of one or both of the tools for purposes of shock and vibration absorption. It is not desirable to permit two hard metal, ultrasonically energized parts contact each other while energized, particularly, under a substantial force, inasmuch as such contact may be damaging to the components. Therefore, a stiff but resilient, shock-proof material such as the composite materials just referred to may be used.

Referring now to FIG. 6A, a slightly modified form of the apparatus shown in FIGS. 4–6 is shown. Here, a left-hand forming assembly 246c is shown and a portion of a right-hand forming assembly 246d is also illustrated. These mirror-image parts are essentially identical to their counterparts 246a, 246b, and to each other except that in this embodiment, part 246d is fixed in position and does not reciprocate. Accordingly, in assembly 246c there is a counterpart (not shown) to the bracket 248 shown in FIG. 6 to reciprocate the stack. However, in respect to the stack 246d such a bracket is fixed and serves to fixedly support the non-movable stack 246d.

Referring again to FIG. 6A, it will be understood that the assembly 246d might also be passive, i.e., not ultrasonically energized, if this were desired for some reason, such as if the product did not present any risk of sticking or if the right-hand assembly were only a flat surface rather than having a cavity intended to provide a contoured or decorative relief surface to the product.

Referring now to FIGS. 7 and 8, a further modified form of apparatus is shown. Here, a cutting and forming apparatus generally designated 300 is shown to include drive means in the form of a powered drum or sprocket 302 supporting a belt generally designated 304 and having upper and lower runs 306, 308, each carrying a plurality of substantially identical anvils 310. The apparatus as shown includes, as illustrated in phantom lines, a conditioning chamber or the like generally designated 312 through which products 314 formed by the process may pass during operation. The product removal belt 316 picks up the fully formed and in some cases conditioned products 314 from the upper run 306 of the belt 304 and positions them for transfer to packaging or other processing stations as desired. These steps could, but need not, include enrobing in chocolate or the like.

FIG. 7 shows that in the apparatus 300, a feed source generally designated 318 is shown to contain plural, spaced apart individual pre-cut blanks 320 to be formed into finished products 314 by the inventive process. Each of the pieces 320 is to be fed individually to one anvil of a series of identical anvils 310 passing beneath the feed source 318. As best shown in FIG. 8, an ultrasonically energized stack generally designated 324 (similar to its counterpart in the other examples) is shown to be carried by a pair of brackets 326 secured to a reciprocable plunge bar 328. The stack 324 includes a converter 330, a booster 332, and a horn generally designated 334 having a tool 338 with a forming cavity 340. The anvil 310 includes an upwardly directed contact surface 344. Where necessary, a thin gasket or layer of other material, such as a polyurethane elastomer (not shown) may be provided on the anvils if contact between opposed surfaces would be damaging to the tool. In addition, the anvils thereunder may be made from a tetrofluoroethylene (TFE) material so that they would not be damaged by contact with the ultrasonic tool.

As will be understood by reference to FIGS. 7 and 8, the object of this apparatus is to obtain the benefit of forming a highly contoured product without requiring a pair of ultrasonically energized cavities. As one way of achieving increased mechanical simplicity, the apparatus of FIGS. 7 and 8 does not require the stack and the anvils to have their movement sequences synchronized by precise timing arrangements or servo mechanisms.

The conveyor belt 304 is advanced in steps by an intermittent drive (not shown in detail) and as each individual blank or piece 320a, 320b etc. of feedstock is taken from the feed source and placed onto the anvil 310, the belt advances the cavity through one or more idler stages and then stops the belt in a position of registration beneath the ultrasonic stack 324. During the momentary period of registration when the anvil 310 is stopped beneath the stack 324, the drive for the reciprocable plunge bar 328 causes the bar to move downwardly, carrying the bracket-mounted stack 324 with it and engaging the blank or piece of feedstock 320 received on the anvil with the opposed forming surfaces 340 in the tool 338 and on the surface 344 of the anvil 310. The anvil may have a contoured recess and a retaining mechanism, if desired, to prevent the piece from moving during indexing of the belt. In FIG. 7, the anvils are shown widely spaced apart for purposes of illustration. In practice, their position would depend on process parameters. Customarily, in this apparatus, since individual blanks of feedstock are pre-cut, cutting edges need not be provided on the tool.

However, the forming, which is done through the application of ultrasonic energy, is carried out in a very short time, such as from about 60 to 150 milliseconds (m sec), with the dwell time depending on the type, consistency and conditioning of the material, etc. The ultrasonic action facilitates shaping by suitably plasticizing the product and by preventing the product from sticking to the vibratory cavity. The ultrasonic energy also vibrates the cavity sufficiently to secure product release. Accordingly, simply inverting the anvil normally permits the product to drop onto the other belt 316 for one or more subsequent or downstream operations. If the anvil contains a cavity, dislodging the product can be achieved by tapping the anvil, by knockouts, or otherwise.

Referring now to FIGS. 10A and 10C, there is illustrated a relatively simple way in which the invention can be practiced. As shown in FIG. 10A, an apparatus generally designated 500 is shown for producing three rows of individual products generally designated 502, each having a precisely cut silhouette from three continuous strips generally designated 504a, 504b, 504c of confectionery material.

In the illustrated embodiment, a full width supply conveyor generally designated 506 is shown to include a continuous belt 508, and one or more drive and/or tensioning pulleys 510. The conveyor 506 has an upper run 512 and a lower run 514. A product outfeed conveyor generally designated 516 is shown to be oppositely arranged and include a continuous belt 518 trained over a drive and tensioning pulley 520 and serving to divide the continuous belt 518 into upper and lower runs 522, 524. The individual pieces 502 of confectionery are supported on the upper run 522 of the conveyor 518 where they are taken to a site (not shown) for further processing or packaging.

According to the invention, an array of individual forming tools each generally designated 526 is provided. Each tool makes precise cuts at selected points in each strip 504a, 504b, etc. of confectionery material. As shown in FIG. 10C, each forming tool 526 includes a body portion 528, a continuous sidewall 530 of thin cross-section terminating in a continuous sharp lower edge 532. The body and the sidewalls 528, 530 of the tool 526 are energized ultrasonically in a manner similar to that described in connection with the other embodiments. As the sidewalls 530 and cutting edges 532 of each tool 526 descend, the cutting edges 532 engage the associated strip 504 of confectionery material, cutting individual articles 502 each having a characteristic silhouette from the remainder of the stock 504. This operation leaves a continuous remainder or web 534 of confectionery material which is able to be recycled or reprocessed. In this embodiment, the lower edges 532 of the sidewalls 530 move downwardly in operation until they contact the upper surface of the upper run 508 of the 512 of the conveyor belt. Thereupon, by the use of vacuum or otherwise, such as by the type of amplitude profiling referred to elsewhere herein, each piece 502 having the precisely cut silhouette is in turn picked up and transferred to the outbound conveyor 516.

The ultrasonic actuation of the walls and their lower edges serves to form a precise cut, and the schematically illustrated tooling is capable of making a product having a silhouette of very fine detail. Unlike the apparatus used in other illustrated embodiments, no attempt is made to reform or reshape the product, nor to emboss, deboss or otherwise add texture, relief or surface finish to the top or sidewall surfaces of the product. The embodiment just described illustrates the operational principle of utilizing the vibratory edges for purposes of product cutting only. As pointed out in connection with the other examples, an important advantage is that the vibratory action totally eliminates build up of residues on the cutting edges and enhances the cutting process where inclusions are encountered.

A movement mechanism (not shown in detail) similar to that illustrated in connection with FIGS. 1–2 is utilized to control the plunging or descent movement of the cutting apparatus, its synchronous movement with the conveyor belt and its lifting and transferring of the freshly cut part to an adjacent conveyor or other suitable location. It is possible to incorporate vacuum and/or air pressure as an aid to picking up and releasing the individual products being formed. Other suitable mechanisms known to those skilled in the art may be used for this purpose. Such mechanisms do not form a novel part of the present invention, and accordingly, not being necessary for an understanding of the instant inventive principles, a detailed description of them is omitted.

Referring now to FIG. 10B, an apparatus generally designated 550 is shown to be provided for producing groups 552 of products from each of a plurality of forming tools 554 arranged for movement of the type described and illustrated in FIGS. 1, 1A and 2 and shown by the directional arrows in the drawings. Here, the supply conveyor 556 includes a continuous belt 558, trained over one or more drive and/or tensioning pulleys 560. The feed or supply conveyor 556 also includes an upper run 562 and a lower run 564. An adjacently disposed product outfeed conveyor generally designated 566 is also shown to include provide continuous withdrawal of form products. The conveyor 566 includes a drive belt 568 trained for continuous operation over drive and tensioning pulley 570 dividing the belt 568 into upper and lower runs 572, 574, as well as other runs shown only partially. Individual groups 552 of confectionery products, each including plural products 551, 551a, 551b, etc. are supported on the upper run 572 of the conveyor.

Here, as in FIG. 10A, there are a plurality of forming tools 576, each having a body portion 578 provided with multiple cavities defined in part by multiple continuous thin sidewalls 580 and continuous sharp lower edges 582. Their manner of being energized and their motion sequence is the same as that illustrated in FIGS. 1, 1A and 2 and the same as that described in connection with FIG. 10A. The only difference is that the residual webs of material 554 contain plural groups of openings 585 rather than plural individual openings.

Of course, in keeping with the invention, it is possible to use multiple cavity apparatus in multiple tool arrays in order to make products that are cut and formed as well as merely cut. In such instance, the operational principles remain the same and only the type or style of cavity would be different.

FIG. 16 is a block diagram showing the form of operation or method carried out with the apparatus of FIGS. 1–2, FIG. 10A and/or FIG. 10AA. As is apparent from FIG. 16, a strip of confectionery material is continuously advanced, as by a conveyor. At a selected point, the strip is engaged by the tool which moves downwardly into engagement with the strip and which is moving at a synchronous rate relative to the strip.

Ultrasonic energy applied during contact between the tool and the strip assist the tool in cutting and forming a piece of product. After this strip is completed, the tool is accelerated forward so as to separate the just-formed product from the still advancing, leading edge of the strip. Thereupon, the tool is lifted out of contact with the strip. The tool is then returned to its initial position for repetition of the cycle, while the just-formed product is transferred to the output conveyor.

Figure 13:
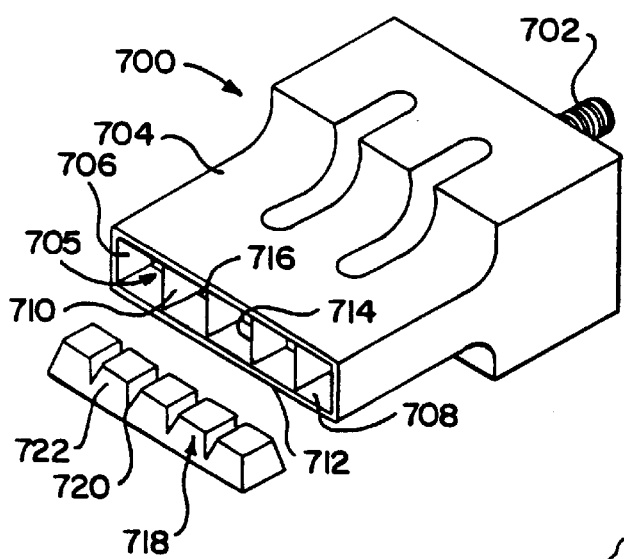
FIG. 13 is a perspective view of a forming tool with a cavity adapted to produce the form of confectionery products shown adjacent the forming tool.

Referring now to FIG. 13, there is shown an ultrasonic tool generally designated 700 which includes an attaching fastener 702 for attachment to a booster or the like. The body portion 704 of the tool 700 includes a cavity generally designated 705 defined by inner end walls 706, inner side walls 708, and a plurality of divider walls 710. According here to the inventive concept, the divider walls 710 terminate in lower edges 712 which are somewhat raised in respect to the extent of the bottom surfaces 714 of the side and end walls 706, 708. The inner or top wall 716 of the cavity 705 may or may not be embossed or otherwise textured, depending on the form of final products sought to be made using the tool 700.

As is shown in FIG. 13, the main purpose of forming the tool 700 in the manner illustrated is to produce a segmented bar 718 having portions generally designated 720 of reduced cross-section or weakness lying between the individual segments 722 making up the bar 718 as a whole.

Figure 14:
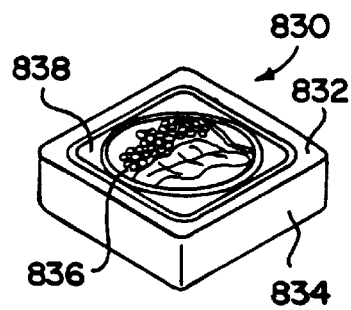
FIG. 14 is an illustrative example of a form of confectionery product having a finely detailed relief face on its upper surface and made according to the invention.

Referring now to FIG. 14, an illustration is presented of a form of confectionery product such as a candy piece or bar generally designated 830 having a body 832 defined in part by plain or unadorned side walls 834 and shown to include a contoured or relieved design 836 on the upper surface 838 of the bar or piece 830. Such a generally flat but relieved upper surface is readily formed using an ultrasonically activated tool having a cavity with the reverse image of the product shown. In the type of product shown, it is assumed that the side walls 834 are formed by use of ultrasonic cutting edges on the cutting and forming tool (not shown).

Figure 15:
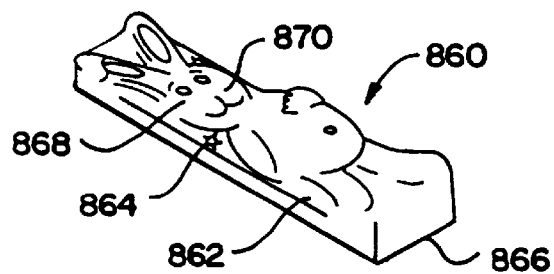
FIG. 15 is another illustration of a typical form of confectionery product able to be made using the apparatus and method of the invention.

Referring now to FIG. 15, a novelty-type candy or other confectionery product generally designated 860 is shown. Here, the body 862 of the product is shown to include side walls 864 and end walls 866 of different heights, and to include an upper surface 868 that is heavily contoured. In the illustrated case, the form of a rabbit 870 is shown to have relatively deep relief. Such a product may be formed using a deeply contoured cavity but the potential for making deep relief products, with or without flat side walls made by ultrasonic cutting is illustrated in FIG. 15.

Referring now to FIG. 9 and FIGS. 11A–11C, another important aspect of the present invention is shown. This aspect results from the realization that it is not necessary to energize the forming cavity continuously with the maximum ultrasonic amplitude attainable. Instead, the amplitude of the ultrasonic motion of the cavity surfaces, which is indicative of the energy being transferred, is varied periodically. In particular, it is not necessary to maintain the maximum amplitude when the forming horn is not in contact with the product. According to the invention, therefore, the horn is preferably operated at two or more different amplitude levels during processing, depending on the makeup of the product and other forming parameters.

Thus, and referring for example to a sequence of the type described in connection with FIGS. 1 and 2, the energy fed from the power supply to the converter is controlled in such a manner that during indexing of the ultrasonic stack to a position in alignment with and above the stick of material, a lower amplitude is used, perhaps 20 to 30% of the maximum available amplitude. Just before the tool is moved adjacent and into contact with the stick of confectionery product, the power supply output rapidly ramps up to achieve an amplitude which is a high percentage of the maximum amplitude theoretically available, and is equal to what could be termed the normal design amplitude of the tool. Energy is then supplied at this amplitude until the cutting and forming operation is complete, with the power supply then returning to its low amplitude mode until the remainder of the cycle is repeated.

Figure 11A:
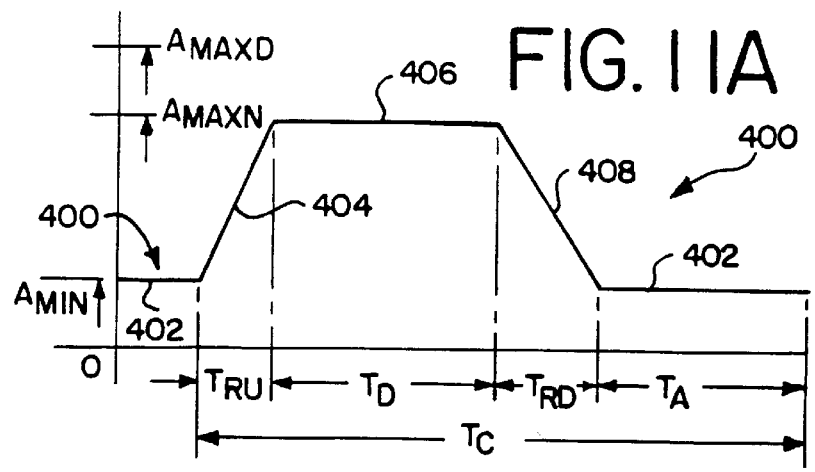
FIGS. 11A–11D are amplitude-time curves showing a variation in the amplitude of ultrasonic motion undergone by the cutting or cutting and forming tools of the invention during certain portions of the product forming and release cycles of the invention.

Referring now to FIG. 11A, there is shown in graphic form an illustration of the concepts referred to generally above. FIG. 11A shows graphically that there is a maximum design amplitude level $A_{max}$, a maximum normal or duty cycle amplitude $A_{max}$ which may be 70% to 85% of $A_{maxd}$, and another amplitude $A_{min}$ which is the minimum amplitude at which the forming tool will operate. This level may typically be some 30% of $A_{maxd}$. Thus, FIG. 11A illustrates attaining two operative levels $A_{min}$ and $A_{maxn}$ between zero level and a maximum design amplitude, i.e. the maximum amplitude $A_{maxd}$ at which a tool could be made to operate.

The actual amplitude level achieved from time-to-time is shown by a line generally designated 400 and shown to have an initial, idling or off-duty portion 402, an inclined portion 404 wherein the amplitude ramps up until it reaches and levels off at the $A_{maxn}$ 406. Here, it remains for a significant time before ramping down as at 408 to the idling level 402 which is equal to its energized but low output level just discussed.

Referring again to FIG. 11A and the legends beneath the curve illustrating the amplitudes, it will be noted that one complete cycle is designated $T_c$. This cycle time, which is repeated periodically during operation of the machine, comprises a number of components which are listed at the bottom of FIG. 11A. From left to right, these are the $T_{RU}$ or "ramp up" time, a dwell time $T_D$ wherein the tool is actually in contact with the confectionery product and fully energized, the time $T_{RD}$ is a transient, "ramp down" period during which the amplitude decreases from $A_{maxn}$ to $A_{min}$. Thereafter, $T_A$ or the "lair" time is the time at which the forming tool is in the air, i.e. disengaged from the product.

The air time is used for the return and reset portion of the cycle. Accordingly, and referring for example to a cycle of the type of illustrated in FIGS. 1, 1A and 2, the acoustic tool 70 would be continually energized, but maintained at the relatively low level amplitude $A_{min}$ until just prior to entering the work, i.e. being plunged into the strip of confectionery material. During the time just prior to this movement, the energy level would ramp up so that, upon first contact, the amplitude would be at $A_{maxn}$. This amplitude is then maintained until such time as the tool is withdrawn. Thereafter the amplitude ramps down to the idling or low amplitude level $A_{min}$ until the tool is repositioned and the cycle is to be repeated.

Figure 11B:
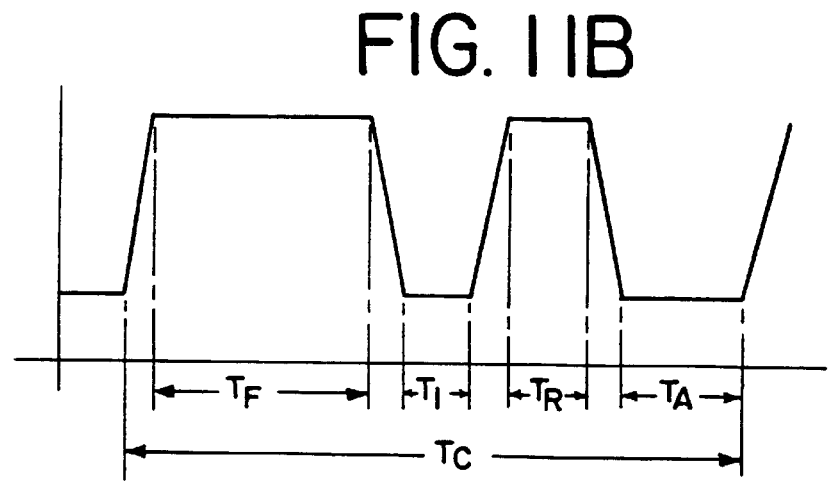

FIG. 11B shows a concept similar to that of FIG. 11A except that the total cycle time $T_c$ is divided differently. Here, there are two peaks of different duration, each accompanied by a ramp up and ramp down period. The ramp up and ramp down times are not illustrated in the lower portion of the legend, wherein the duty or dwell cycle is subdivided into different components. Thus, a time period $T_F$ is shown wherein maximum amplitude is achieved during the forming portion of the cycle, which includes the initial entry into the confectionery strip and extends through the time at which the entire inner cavity surfaces have contacted appropriate portions of the strip and completed the formation of the product.

Thereafter, there may be a period $T_I$ or an idling time wherein the acoustic tool has completed forming the product but is still in contact with it. After time, $T_I$ has elapsed and it is desired to achieve or insure separation of the formed product from the leading edge or surrounding portions of the strip, the tool is again energized at a higher level for a period of time illustrated as $T_R$ or, release time. When the maximum amplitude is again applied to the tool, the formed piece is released from the horn cavity. Thereafter, a period $T_A$ or "air time" of the tool occurs that is the same as that discussed in connection with FIG. 11A.

Figure 11C:
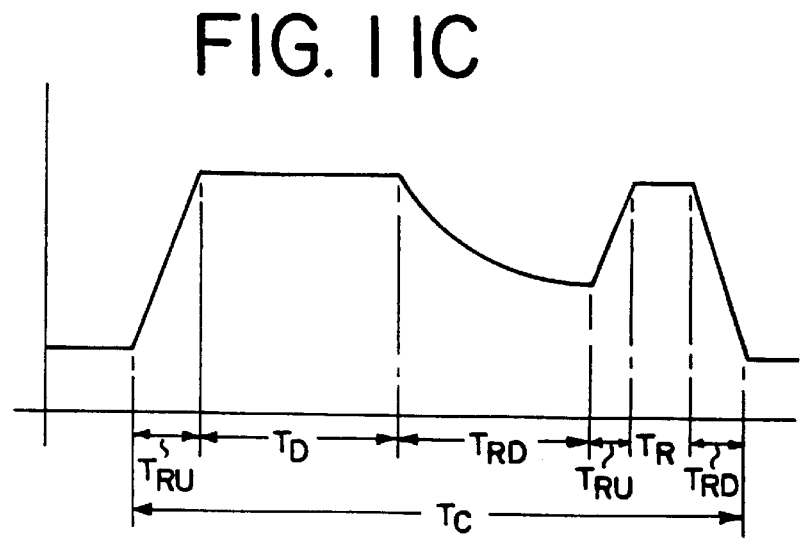

Referring to FIG. 11C, a similar concept is illustrated, except that some of the ramp up and ramp down times are shown as exponential. This is because, for practical reasons, the ramp up rates may actually taper off, or it may be desired to modulate the rate of ramping up or down. In the illustrated case, one ramp down portion of the cycle is a partial or incomplete ramp down, i.e., the amplitude does not go as low as the initial or air time minimum amplitude.

Here, in FIG. 11C, the expressions beneath the curves have the same meaning as their counterparts above, namely, $T_{RU}$ and $T_{RD}$ are ramp up and ramp down times respectively and, $T_D$ is the dwell time or forming and or cutting time while $T_R$ is the release time.

Figure 11D:
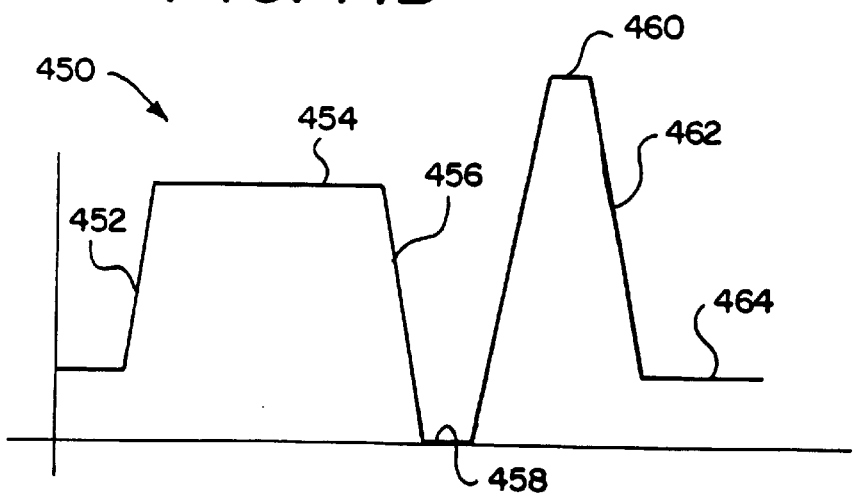

Referring now to FIG. 11D, a similar concept is shown wherein three separate levels of amplitude are shown, as well as a zero or inactive state. This profile might be used in a "pick and place" operation. In the profile illustrated, the portion of the curve 450 is an "air" time which occupies a given duration prior to beginning of the forming cycle. This is followed by a ramp up time 452 and a dwell time 454 wherein formation of the product is taking place. The ramp down time 456 follows forming of the product and terminates at a zero level whereat the tool is de-energized. Thereafter, a ramp up time occurs just after which a maximum or release amplitude 460 is created for a brief duration, following which a ramp down time 462 elapses as the tool is thereafter returned to an active but idle or air time amplitude as shown at 464.

FIG. 11D shows that various levels may be achieved for particular desired purposes and that it is not necessary that the maximum or minimum useful amplitudes be the same as their counterparts in the other illustrations. In other words, the energy level for formation and that for release may be different; the idle or air time amplitude may be the same but may also be zero (no ultrasonic energy) between portions of the cycle.

One application is a "pick and place" sequence wherein it is desired to have no post-formation energy imparted during a transfer time, after which the cavity is energized strongly to secure product release.

Depending on the exact nature of the product and the application, variations in dwell times and amplitude values may be desired by those skilled in the art. This process may be referred to collectively as "amplitude profiling."

This ability to achieve different levels of amplitude at the horn face cavity is easily accomplished by the combination of a dedicated controller and a standard power supply.

The amplitudes of vibration may vary depending upon the power and tool design. However, with frequencies of 20 KHZ being used to mold larger pieces and another frequency, such as 40 KHZ, being used to make smaller pieces, the amplitudes that have been found useful have ranged from 5 microns at an "off duty" or idle level such as that illustrated in FIGS. 11A–11D, and up to 15–20 microns at the 80% level shown at 406 in FIG. 11A. Representative amplitudes that are believed useful on an overall basis vary from 5 to 100 microns as a probable maximum with from about 5 up to about 20 to 35 microns being the presently preferred range.

In this connection, reference is made to FIG. 9. This illustration is very schematic, but it shows that, when power is applied to the ultrasonic stack, standing wave generally designated 600 in FIG. 9 is developed in the forming tool or horn. Such a wave 600 has a node point 602 and a pair of anti-nodes or high amplitude portions 604. As the amplitude of such a wave increases, at the same frequency, (as shown by the dotted line wave form 606), the applied power or energy increases.

When a forming tool 608 is designed so that a standing wave is present in the tool, as illustrated, the node portion 610 of the forming tool will be substantially stationary, regardless of the amplitude of the other portions of the wave. As the amplitude of the standing wave increases, the displacement of the anti-node portion of the wave also changes, causing the cavity face and edges of the tool 612, 614, to move, within limits, to different excursion levels, i.e., higher amplitude vibrations. Once a certain amplitude has been reached, additional energy input may raise the force of the vibrations without increasing their amplitude. Energy application is controlled by the power supply as necessary, usually resulting in an amplitude that ranges within those limits described in connection with FIGS. 11A–11D.

Referring now to other aspects of the invention, for confectionery use, it has been found preferable to form the tooling from titanium alloys. The mechanical properties of these alloys, and their compatibility with confectionery products combine with their desirable acoustic properties to render them highly suitable for use with the apparatus of the invention. Regarding the form of confectionery products with which the process and apparatus are effective, candy bars, "frozen" confectionery products, and other confectionery products such as fudge, chocolate, toffee, caramel, nougats, etc. can be cut and formed using the apparatus of the invention. Some such products can be used as formed, and others can be enrobed with chocolate. Various high production, continuous type methods having been described in detail, it will be apparent to those skilled in the art that if it is desired for any reason to conduct manufacturing on a reduced scale, this is also possible.

While the applicant does not wish to be bound by any particular principle or theory of operation, it is believed that the combination of mechanical forces and ultrasonic energy combine to plasticize a confectionery product in the form of a strip, rope or slab sufficiently to reform it but without melting the strip. The plasticity enables the product to be shaped under comparatively moderate forces and to achieve virtually 100% cavity filling. The amplitude of the vibration of the molding surfaces is such that a fine surface finish can be imparted to the product and yet virtually 100% cavity release can be achieved. Normally, there is no detectable product build up on the interior of the forming cavity even after a substantial period of time.

The temperature of the extrusion or slab for most candy products is commonly maintained just above room temperature, usually in the 18° to 35° C. range. Other products are processed at different temperatures. The vibratory motion imparted to the cutting edges of the tool of the forming tool enable relatively hard inclusions, such as nuts or the like, to be cut without incident.

The comparatively simple positioning of the ultrasonic stack for movement and the availability of servo motors or other control mechanisms renders the process equipment capable of inclusion into existing production lines without disruption or addition of significant cost. Thus, existing extruders, packagers, and the like may be utilized without change or modification.

In the embodiment of FIGS. 1, 1A and 2, an output conveyor operating at a higher speed than the input conveyor is illustrated, but as long as the individual products made are spaced from the leading edge of the slab, such conveyor speed is not absolutely necessary.

The apparatus and method described have been proven capable of rendering a strip or slab of confectionery material usable to create a particular taste, consistency and eating characteristics in a given product as the feedstock for producing true analog products, i.e. those having those same characteristics in a product of an entirely different shape. Complex shapes and shapes with rounded bottoms, textured surfaces and the other characteristics described herein can readily be made.

It will thus be seen that the present invention provides several methods and apparatus for forming confectionery products and representative embodiments having been described by way of example, it is anticipated that variations to the described forms of apparatus and method will occur to those skilled in the art and variations and that changes may be made in such methods and forms of apparatus without departing from the spirit of the invention or scope of the appended claims.

I claim:

1. An apparatus for continuous manufacture of confectionery products, said apparatus including a frame, an input conveyor secured to said frame and including upper and lower run portions and a drive mechanism for operating said conveyor at a first given speed; an output conveyor secured to said frame and having an upper run, a lower run and a drive mechanism for operating said output conveyor at a second higher speed, said output conveyor being positioned adjacent and downstream of said input conveyor, said output conveyor being positioned to receive products formed on a downstream end portion of the upper run of said input conveyor, an ultrasonic stack including an energy converter for changing electrical energy into ultrasonic vibration, a booster for increasing the amplitude of said vibration and an ultrasonic horn having surfaces defining a cutting edge and a forming cavity with a predetermined interior shape and surface finish, a carrier for said stack, said carrier being positioned by a portion of said frame, and at least one motor and control for moving said stack generally parallel to said downstream end portion of the said upper run of said input conveyor, a mechanism for plunging said stack from a raised initial position to a lowered position adjacent said upper run of said input conveyor, thus enabling said stack to be lowered into contact with a portion of a continuous supply of confectionery material positioned on said upper conveyor run portion at a first rate so as to be synchronized with the movement rate of said upper run portion, said mechanism for plunging said stack also being capable of accelerating said stack away from the leading edge of said continuous supply of confectionery material so as to space an individual piece formed by said cavity from said leading edge and into a position adjacent the upstream end of said upper run of said output conveyor, and said mechanism further being capable of moving said cavity out of engagement with of stack and to return said stack to said initial position.

2. An apparatus as defined in claim 1 wherein said input conveyor further includes a support plate beneath its upper run portion adjacent said downstream end thereof.

3. An apparatus as defined in claim 1 wherein said motor and control is in form of a programmable servomotor.

* * * * *

UNITED STATES PATENT AND TRADEMARK OFFICE
CERTIFICATE OF CORRECTION

PATENT NO. : 5,871,783
DATED : February 16, 1999
INVENTOR(S) : Roberto A. Capodieci It is certified that error appears in the above-identified patent and that said Letters Patent is hereby corrected as shown below:

Column 12,
Line 38, delete "FIGS. 12a and 12b" and insert -- FIGS. 12A and 12B --.

Column 15,
Line 62, delete "FIG. 10AA" and insert -- FIG. 10B --.

Column 17,
Line 40, delete ""lair"" and insert -- "air" --.

Signed and Sealed this

Fifteenth Day of April, 2003

JAMES E. ROGAN
*Director of the United States Patent and Trademark Office*